United States Patent
Tomisawa et al.

[11] Patent Number: 5,850,811
[45] Date of Patent: Dec. 22, 1998

[54] APPARATUS FOR CONTROLLING TIMINGS OF EXHAUST VALVES AND METHOD THEREOF

[75] Inventors: Naoki Tomisawa; Seizi Suga, both of Atsugi, Japan

[73] Assignee: Unisia Jecs Corporation, Kanagawa-ken, Japan

[21] Appl. No.: 917,830

[22] Filed: Aug. 27, 1997

[30] Foreign Application Priority Data

Aug. 28, 1996 [JP] Japan .................................. 8-226831

[51] Int. Cl.$^6$ .................................................... F02D 13/00
[52] U.S. Cl. .................................. 123/90.15; 123/90.17; 60/284
[58] Field of Search ........................ 123/90.15, 90.16, 123/90.17; 60/284, 285

[56] References Cited

U.S. PATENT DOCUMENTS

| | | | |
|---|---|---|---|
| 5,233,831 | 8/1993 | Hitomi et al. ............................. | 60/284 |
| 5,293,741 | 3/1994 | Kashiyama et al. .................. | 123/90.15 |
| 5,398,502 | 3/1995 | Watanabe ............................... | 123/90.15 |
| 5,421,308 | 6/1995 | Hitomi et al. ......................... | 123/90.15 |
| 5,622,144 | 4/1997 | Nakamura et al. ................... | 123/90.15 |

FOREIGN PATENT DOCUMENTS 0 718 475 A1  6/1996  European Pat. Off. .

*Primary Examiner*—Weilun Lo
*Attorney, Agent, or Firm*—McDermott, Will & Emery

[57] ABSTRACT

The timing for opening the exhaust valve is advanced by an angle that varies depending upon the load exerted on an engine and the rotational speed of the engine at the cold starting of the engine during a predetermined period of time after the complete combustion. The heat of combustion is positively discharged into an exhaust system and, hence, an oxygen sensor and a catalytic converter disposed in the exhaust system of the engine are activated more quickly.

8 Claims, 5 Drawing Sheets

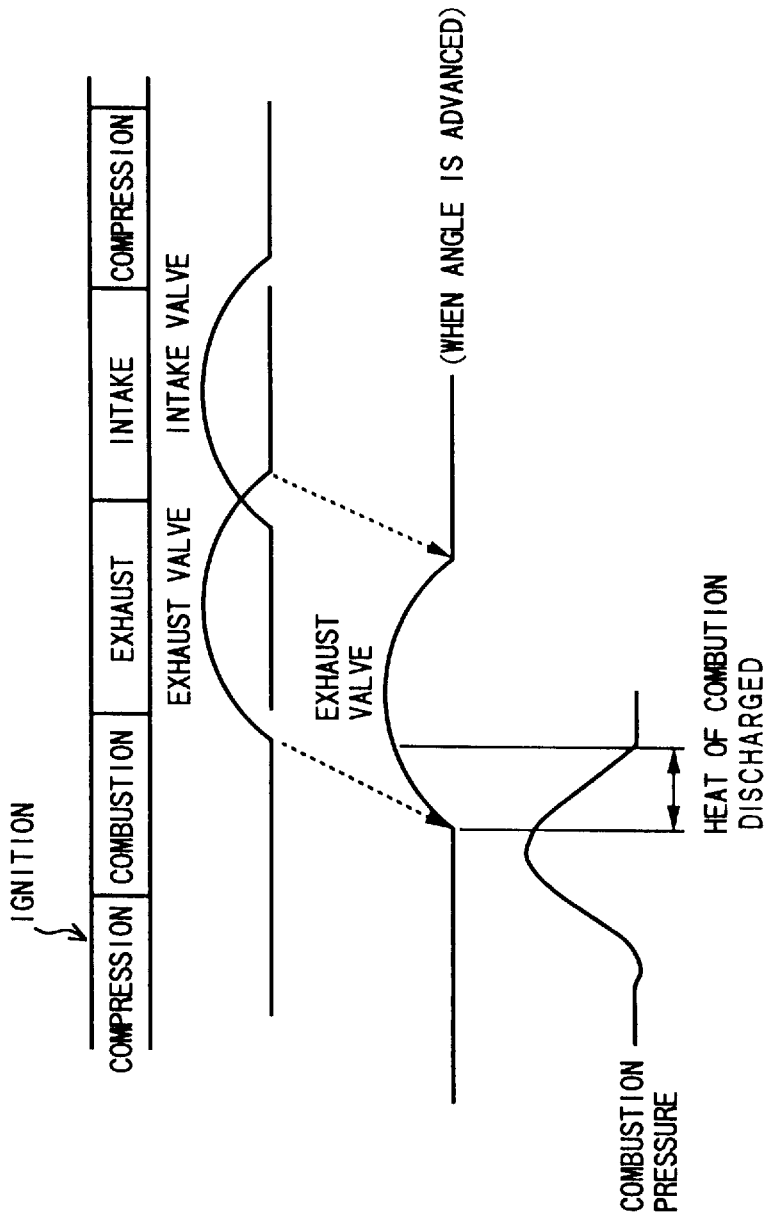

APPARATUS FOR CONTROLLING TIMINGS OF EXHAUST VALVES AND METHOD THEREOF

FIELD OF THE INVENTION

The present invention relates to an apparatus for controlling timings of exhaust valves and to a method thereof. More particularly, the invention relates to technology for promoting the activation of components in an exhaust system, such as oxygen sensor, catalytic converter and the like during the cold starting of an engine by controlling the timings for opening the exhaust valves.

RELATED ART OF THE INVENTION

In order to purify exhaust gases emitted during the cold starting of an internal combustion engine, it is necessary to activate, in an early time, the components in the exhaust system, such as catalytic converter for purifying the exhaust gases, oxygen sensor for feedback controlling the air-fuel ratio, and the like. The following methods A to C have heretofore been proposed in an attempt to activate the components in an early time.

A: A method in which the ignition timing is retarded after the cold starting to produce after-burning in order to activate the catalytic converter in an early time by utilizing the heat of exhaust gases.

B: A method in which the air-fuel ratio of the mixture gas is enriched after the cold starting, and the air is forcibly introduced by an air pump into the the upstream side exhaust system, such as the catalytic converter, in order to activate the catalytic converter and the like in an early time by utilizing the heat of combustion in the exhaust system.

C: A method in which a heater of a large capacity is incorporated in the catalytic converter, and the catalytic converter is forcibly heated by supplying an electric current to the heater after the cold starting.

According to the above-mentioned method A, the ignition timing must be extremely retarded in order to sufficiently elevate the exhaust gas temperature causing, however, the operation performance and fuel efficiency to be deteriorated.

The above-mentioned method B makes it necessary to provide a hardware such as air pump and valve for controlling the air supplied into the exhaust system, resulting in an increase in cost.

The above-mentioned method C requires an increased cost for installing the heater and the like, and further necessitates improvements in the electric charging system of the engine so that an electric current can be supplied to the heater of a large capacity, resulting in an increase in cost.

SUMMARY OF THE INVENTION

The present invention was accomplished in view of the above mentioned problems, and its object is to provide an apparatus for activating a catalytic converter and the like in an early time without greatly driving up the cost and without deteriorating the operation performance or fuel efficiency, and to a method thereof.

In order to accomplish the above-mentioned object according to the apparatus and method of controlling timings of exhaust valves of the present invention, the timing for opening the exhaust valve is advanced by a predetermined angle by a variable valve timing mechanism during the cold start of an engine, to thereby promote the elevation of temperature of an exhaust system.

The timing for opening the exhaust valve is advanced (opening timing is quickened) during the cold start of an engine, i.e., while the catalytic converter and oxygen sensor in the exhaust system are cold and inactive, so that the heat of combustion in a cylinder is positively discharged into the discharge system to elevate the temperature of the exhaust system.

Therefore, any engine equipped with a variable valve timing mechanism enables the catalytic converter and the like to activate in an early time by simply changing the control specifications. According to the method of advancing the timing for opening the exhaust valve, furthermore, the operation performance is less affected and the temperature rises more efficiently than when the temperature is elevated by retarding the ignition timing.

The variable valve timing mechanism may be the one in which the timing for opening and closing the exhaust valve is changed by adjusting the phase of a cam shaft with respect to a crank shaft, as well as the one in which a plurality of cams are used being changed over, and may further be the one in which the cam shaft is moved in parallel to change the lift and timing.

It is here preferable that the timing for opening the exhaust valve is advanced by a predetermined angle during a predetermined period of time after the starting when the engine temperature at the time of start is equal to or lower than a predetermined temperature.

Even during the cold starting of the engine, the timing for opening the exhaust valve is not advanced from when the engine is started but is controlled during a predetermined period of time after the starting, so that controlling the timings for opening the valves will not affect the starting performance.

It is further preferable that a state until a predetermined period of time has elapsed after the complete combustion is detected as the starting state, and the timing for opening the exhaust valve is advanced by a predetermined angle during a subsequent predetermined period of time.

According to this constitution, the timing for opening the exhaust valve is not readily advanced after the completely burned state is established but is controlled after a predetermined period of time has elapsed from when the completely burned state is established. This makes it possible to avoid such an occurrence that the timing for opening the exhaust valve is advanced in an unstable state immediately after the start causing the engine loses stability.

It is preferable that the complete combustion of the engine is judged when the rotational speed of the engine is equal to or higher than a predetermined rotational speed.

According to this constitution, the completely burned state is judged based upon whether an actual rotational speed of the engine has reached a rotational speed that meets the completely burned state or not. Thus, the completely burned state of the engine is properly judged, and the timing for opening the exhaust valve is properly controlled.

It is further preferable that the timing for opening the exhaust valve is advanced only when the engine is in a predetermined light-load operation state.

According to this constitution, the timing for opening the exhaust valve is not advanced when the engine is in a heavy-load operation state even within a predetermined period of time after the cold starting, but the timing for opening the exhaust valve is advanced only in a light-load operation state. This makes it possible to avoid such an occurrence that the timing for opening the exhaust valve is unnecessarily advanced in a state where the engine is in operation bearing a heavy-load generating sufficient amounts of heat of exhaust gases.

It is further preferable that a predetermined angle by which the timing for opening the exhaust valve is advanced, is variably set depending upon the operation conditions of the engine.

According to this constitution, different angles for advancement are set depending upon the operation conditions of the engine when the timing for opening the exhaust valve is to be advanced. This makes it possible to properly advance the angle depending upon the operation conditions of the engine and, hence, to promote the activation of the catalytic converter and the like to a maximum degree without deteriorating the operation performance.

It is further preferred to variably set the predetermined angle by which the timing for opening the exhaust valve is advanced, depending upon the load exerted on the engine and the rotational speed of the engine as operation conditions of the engine.

According to this constitution, different angles for advancement are set depending upon the load and rotational speed of the engine, and the timing for opening the exhaust valve is advanced depending upon the angle for advancement. Thus, the angle is properly advanced depending upon the load of the engine and the rotational speed of the engine, and the catalytic converter and the like are activated as early as possible without deteriorating the operation performance.

It is further preferable that the timing for opening the exhaust valve is advanced for only a predetermined period of time depending upon the temperature of the engine at the time of start.

According to this constitution, the timing for opening the exhaust valve is advanced for only a period of time that corresponds to the temperature of the engine at the time of start, i.e., that corresponds to the temperature of the catalytic converter and the like. Thus, the timing for opening the exhaust valve is advanced for only a period of time that is enough for activating the catalytic converter and the like.

Other objects and features of the present invention will become obvious from the following description of the embodiment in conjunction with the accompanying drawings.

BRIEF DESCRIPTION OF THE DRAWINGS

FIG. 5 is a time chart illustrating a correlation between the advancement of the timing for opening the exhaust valve and the state of combustion.

PREFERRED EMBODIMENT An embodiment of the present invention will now be described.

Figure 1:
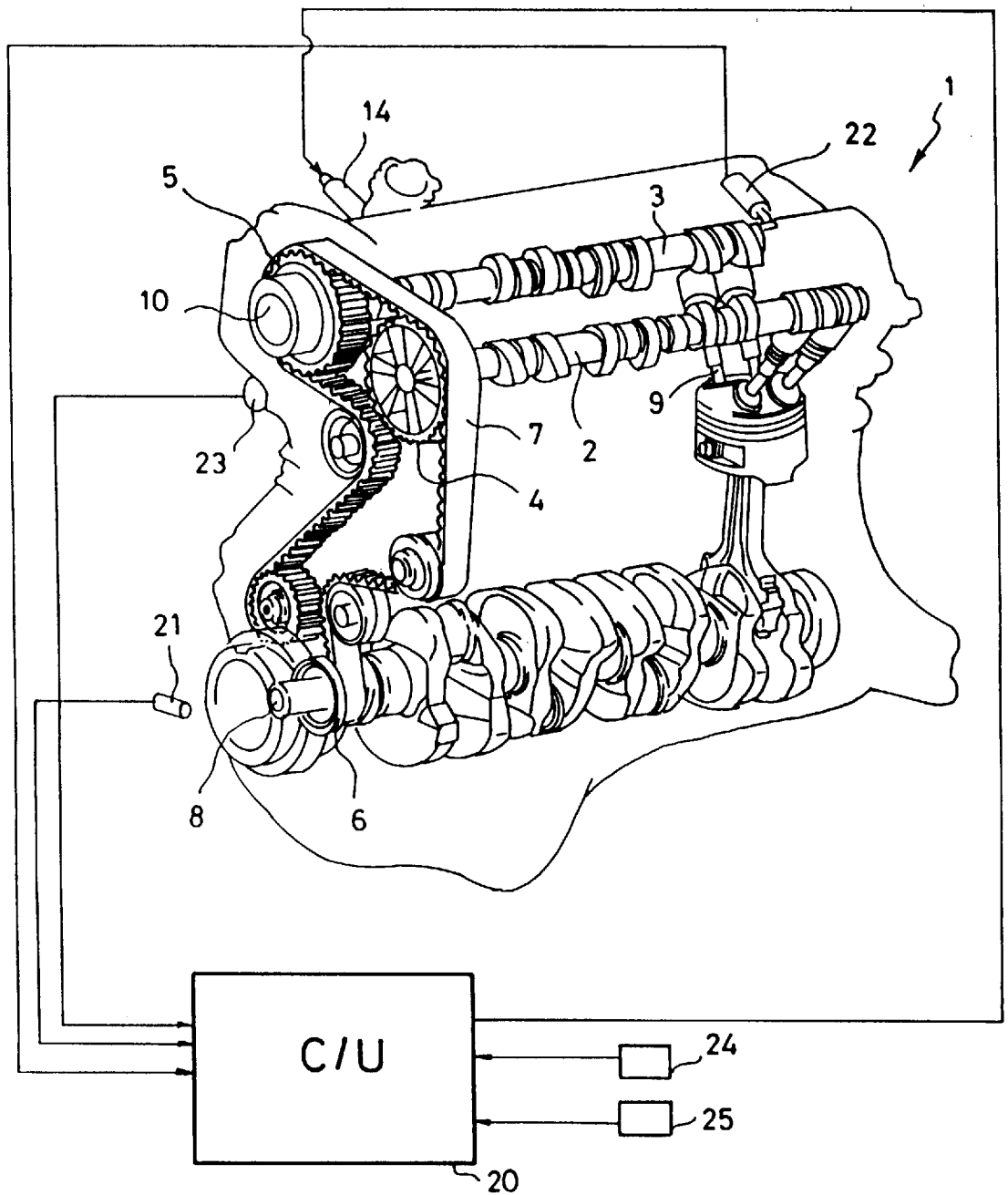
FIG. 1 is a diagram of a system constitution illustrating an internal combustion engine according to an embodiment of the present invention.

An internal combustion engine 1 shown in FIG. 1 is equipped with a cam shaft 2 of the intake side and a cam shaft 3 of the exhaust side which are independent from each other. A timing belt 7 wrapped around a crank pulley 6 is in mesh with cam pulleys 4 and 5 that are attached to the ends of the cam shafts 2 and 3, and the cam shafts 2 and 3 are rotatably driven in synchronism with the rotation of a crank shaft 8.

The cam shaft 3 of the exhaust side is provided with a variable valve timing mechanism 10 that varies the timing for opening and closing an exhaust valve 9.

Figure 2:
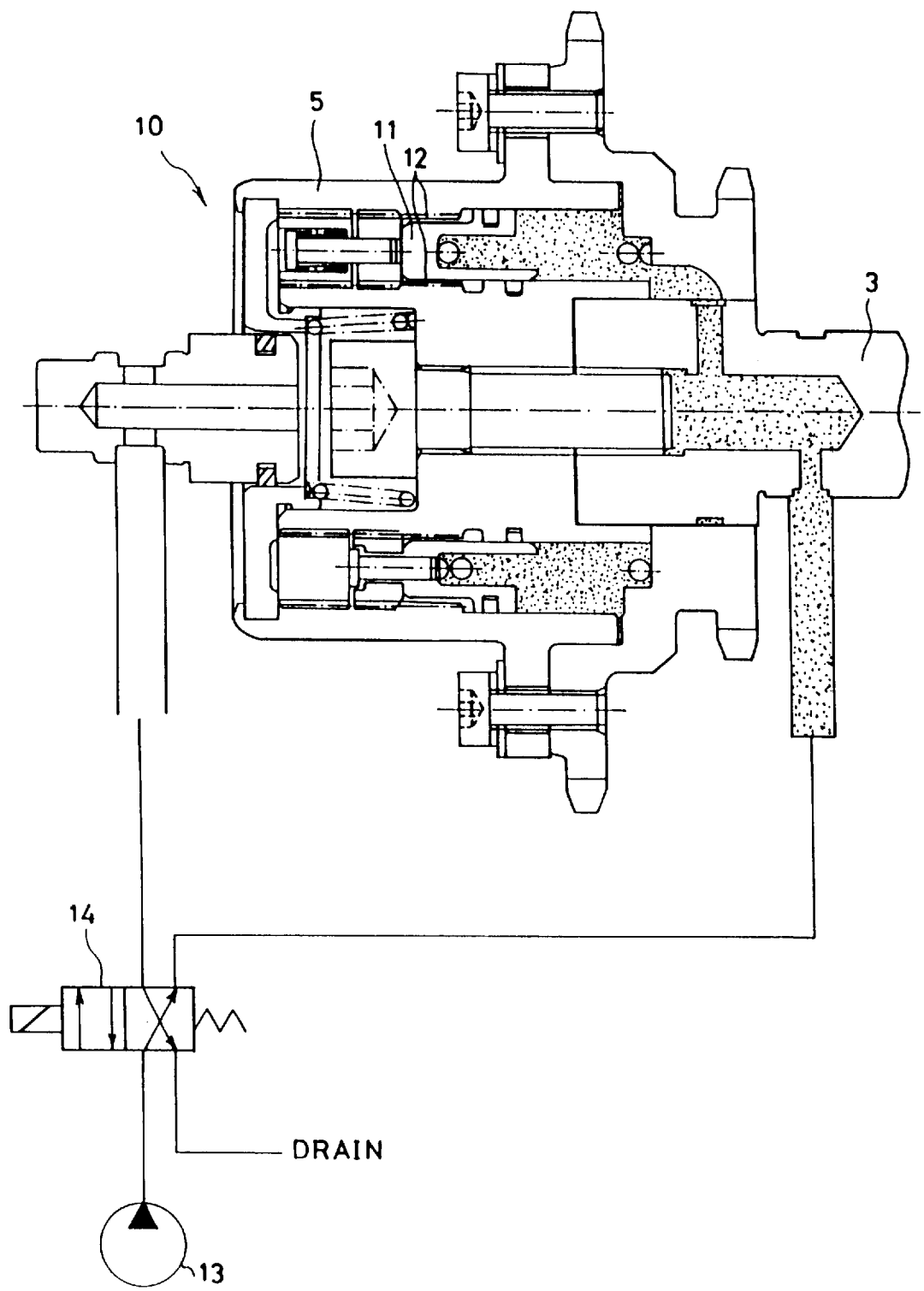
FIG. 2 is a sectional view illustrating a portion of a variable valve timing mechanism according to the embodiment.

The variable valve timing mechanism 10 controls the phase between the crank shaft 8 and the cam shaft 3 of the exhaust side thereby to vary the timing for opening and closing the exhaust valve 9, and is constituted as concretely shown in FIG. 2.

In FIG. 2, a plunger 11 is in mesh with the cam pulley 5 of the exhaust side and with the cam shaft 3 of the exhaust side via a helical gear 12. As the plunger 11 moves in the axial direction due to a hydraulic pressure of an operation oil fed from an oil pump 13, the cam shaft 3 of the exhaust side and the plunger 11 rotate together since the cam pulley 5 of the exhaust side is secured via the timing belt 7, and whereby the relative positions of the cam pulley 5 of the exhaust side and of the cam shaft 3 of the exhaust side undergo a change in the circumferential direction. Accordingly, the phase of the cam shaft 3 of the exhaust side changes relative to the crank shaft 8, and hence, the timing for opening and closing the exhaust valve 9 is shifted with the operation angle being maintained constant.

The operation oil is fed to the plunger 11 being controlled by a solenoid valve 14. The position for feeding the operation oil and the drain position are changed over by the solenoid 14 in order to reciprocally move the plunger 11 in the axial direction.

A control unit 20 for controlling the solenoid valve 14 receives signals from a crank angle sensor 21, a cam angle sensor 22 of the exhaust side, a water temperature sensor 23, an air flow meter 24, a start switch 25, etc.

The rotational speed Ne of the engine is calculated based on a detection signal from the crank angle sensor 21, a value TP representing the load of the engine is calculated based on the rotational speed Ne of the engine and the intake air flow amount Q detected by the air flow meter 24, and reference is made to a map previously storing a target angle of timing for opening the exhaust valve in response to the rotational speed Ne of the engine and the engine load TP to feedback control the solenoid valve 14 so that a practical timing for opening the exhaust valve detected based on the detection signals from the crank angle sensor 21 and the cam angle sensor 22 of the discharge side will approach the target angle.

Figure 3:
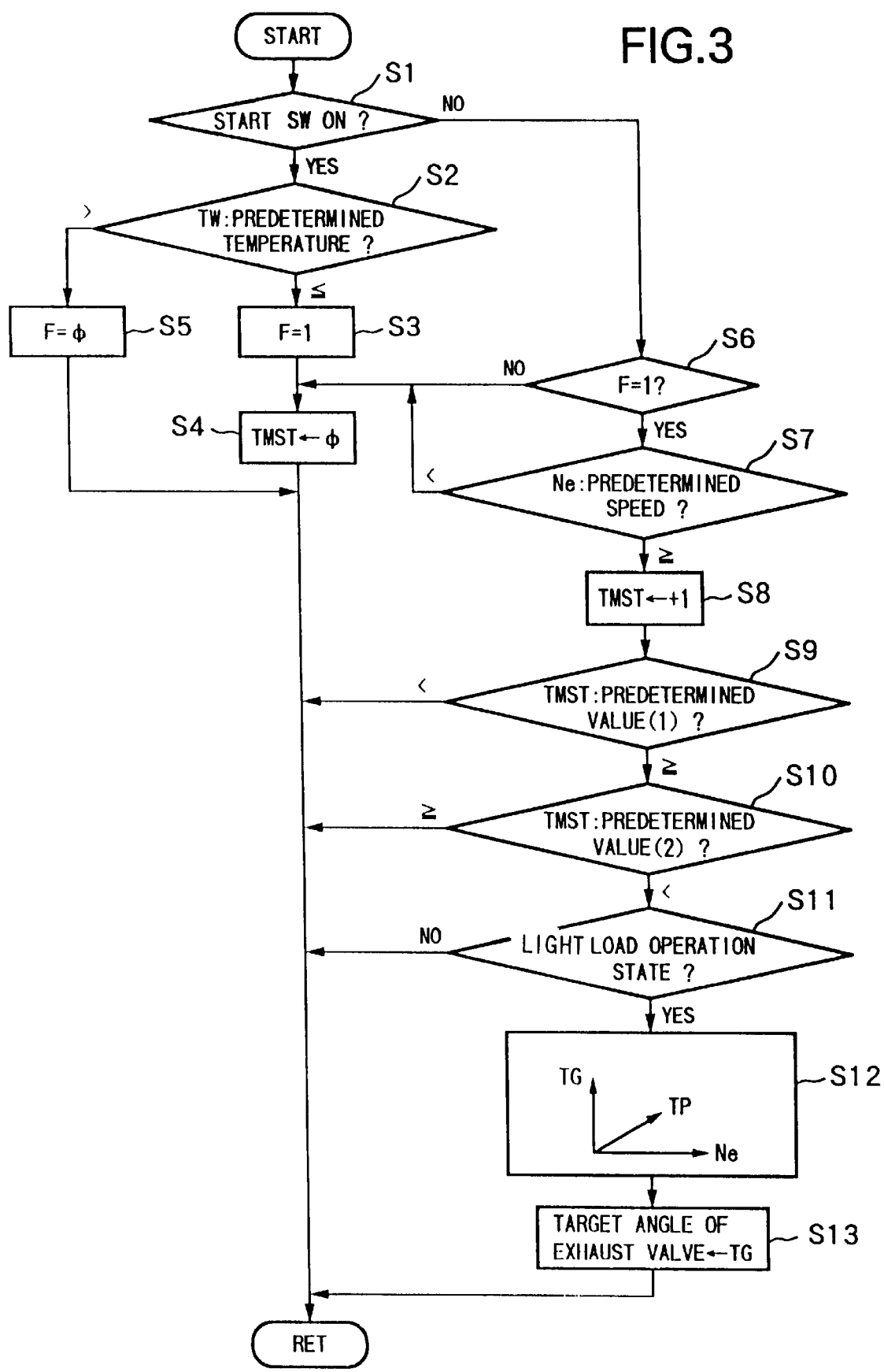
FIG. 3 is a flow chart illustrating the operation for controlling the valve timings for activating the catalytic converter according to the embodiment.

During the cold starting, in particular, the timing for opening the exhaust valve is controlled as shown in a flow chart of FIG. 3, so that an oxygen sensor and a catalytic converter disposed in an exhaust system will be activated in an early time.

The function as a valve timing control means is possessed by a control unit 20 in a software manner as shown in a flow chart of FIG. 3. The function as a start condition detection means is realized by a start switch 25 and by a software function of the control unit 20 illustrated in the flow chart of FIG. 3.

In the flow chart of FIG. 3, it is judged at step 1 (denoted as S1 in the drawing, the same holds hereinafter) whether the start switch 25 is turned on or off.

During the cranking period in which the start switch 25 is turned on, the routine proceeds to step 2 where it is judged whether the cooling-water temperature TW of the engine detected by the water temperature sensor 23 is equal to or lower than a predetermined temperature or not.

The cooling-water temperature TW represents the temperature of the engine, and the water temperature sensor 23 corresponds to an engine temperature detection means.

When the water temperature TW is equal to or lower than the predetermined temperature, in other words, when it is presumed that the oxygen sensor and the catalytic converter disposed in the exhaust system are cold and are inactive, the routine proceeds to step 3 where 1 is set to a flag F and at next step 4, a timer TMST is reset to zero.

When the water temperature TW is higher than the predetermined temperature, on the other hand, the routine proceeds to a step 5 where 0 is set to the flag F.

Thus, 1 is set to the flag F during the cold starting where it is required to positively activate the catalytic converter and the like disposed in the exhaust system.

When it is judged at step 1 that the start switch 25 is turned off, the routine proceeds to step 6 to judge the flag. When the flag F is 1, the routine proceeds to step 7 and to subsequent steps.

When it is judged at step 6 that the flag F is 1 and the engine is being cold started, the routine proceeds to step 7 where it is judged whether the rotational speed Ne of the engine at that moment is equal to or greater than a predetermined rotational speed or not.

Here, the predetermined rotational speed is a threshold value for judging the completely burned state of the engine. The routine proceeds from step 7 to step 4 where the timer TMST is held at zero until the rotational speed becomes equal to or greater than the predetermined rotational speed (see FIG. 4).

As the rotational speed Ne of the engine becomes equal to or greater than the predetermined rotational speed, the routine proceeds to step 8 where the timer TMST is counted up.

Figure 4:
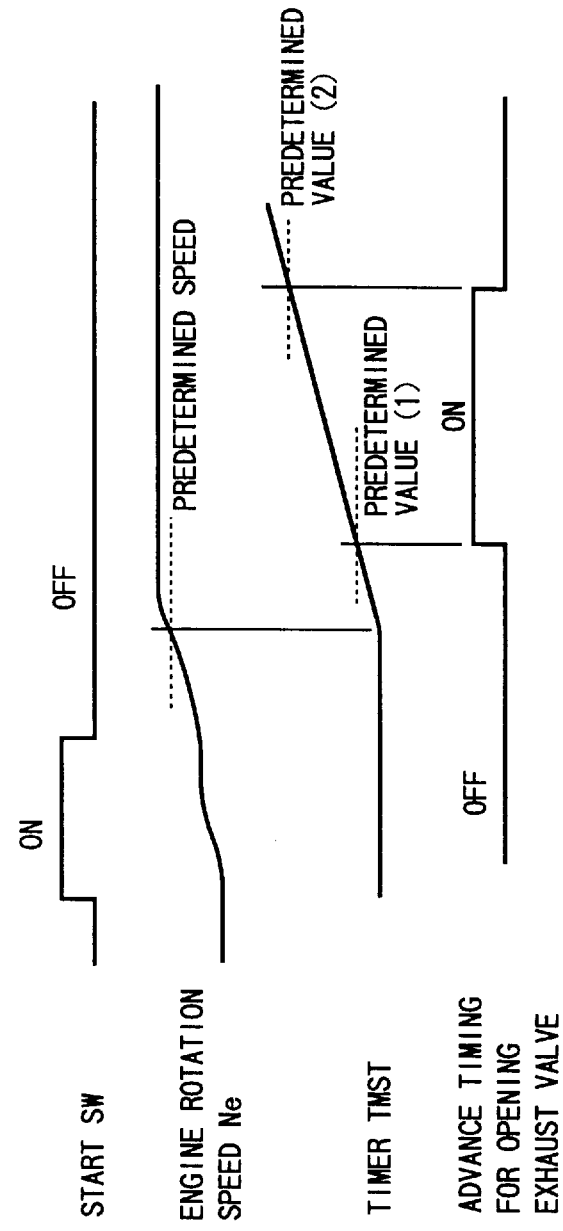
FIG. 4 is a time chart illustrating periods for advancing the timing for opening the exhaust valve according to the embodiment.

At next step 9, it is judged whether the timer TMST becomes equal to or larger than a predetermined value (1) or not thereby to judge whether a predetermined period of time has elapsed from the complete combustion (see FIG. 4).

The control operation is not executed to activate the catalytic converter and the like in an early time before the value of the timer TMST becomes equal to or greater than the predetermined value (1), and the routine ends. When the value of the timer TMST becomes equal to or greater than the predetermined value (1), the routine proceeds to step 10.

At step 10, it is judged whether the value of the timer TMST is smaller than a predetermined value (2) (>predetermined value (1)) or not (see FIG. 4). When the value of the timer TMST is smaller than the predetermined value (2), the routine proceeds to step 11.

At step 11, it is judged whether or not the engine is in the light-load operation state in which the engine load TP is equal to or smaller than a predetermined value. The routine proceeds to step 12 only when the engine is in the light-load operation state.

In order to activate the catalytic converter and the like in an early time, step 12 retrieves a target angle TG corresponding to the present engine load TP and rotational speed Ne of the engine from a target angle map for cold starting, that has been set to the advancing side compared to that of under normal conditions.

At step 13, the solenoid valve14 is feedback controlled based upon the target angle TG retrieved at step 12, so that the actual timing for opening the exhaust valve is brought into agreement with the target angle TG that is set to the advancing side compared to that of under normal conditions.

When the routine proceeds neither to step 12 nor to step 13, it is judged that the timing for opening the exhaust valve is controlled according to the ordinary target angle.

When the timing for opening the exhaust valve is advanced, the heat of combustion is more discharged into the exhaust system so that the oxygen sensor, catalytic converter and the like disposed in the exhaust system are heated more quickly and are activated in an early time (see FIG. 5).

Therefore, any engine equipped with the variable valve timing mechanism 10 enables the catalytic converter and the like to be activated in an early time without requiring additional hardware. Besides, the activation is promoted without seriously affecting the operation performance compared with when the ignition timing is retarded.

In the control operation based on the target angle for cold starting retrieved at step 12, a moment after the passage of the predetermined period of time (1) from the complete combustion is made to be a moment of control start and a moment after the passage of the predetermined period of time (2) from the complete combustion is made to be a moment of control termination (see FIG. 4). Even during the above-mentioned period, the timing for opening the exhaust valve is returned back to the ordinary timing when the engine is in operation in a heavy load state.

When the engine is in operation bearing a heavy load, the heat of exhaust gas is obtained to a sufficient degree and there is no need to advance the timing for opening the exhaust valve ahead of that of under ordinary conditions. Besides, since it is required to produce a large torque in the heavy-load operation state, it is not desired to unnecessarily advance the timing for opening the exhaust valve. Therefore, even during the period in which the control operation is carried out according to the target angle for cold starting, the control operation is returned back to normal control operation when the engine is placed in the heavy-load operation state.

The control operation based on the target angle for cold starting is executed when it is presumed that a predetermined period of time has elapsed from the complete combustion and the engine is in a stable state, so as to avoid that stability of the engine will be impaired by the advanced timing for opening the exhaust valve.

It is preferable that the predetermined value (2) is variably set depending upon the water temperature TW detected when the start switch 25 is turned on, and that the control operation based on the target angle for cold starting is executed for a longer period of time when the water temperature TW is low at the time of starting.

The variable valve timing mechanism is in no way limited to the one constituted as shown in FIG. 2 but may be any mechanism provided it is capable of changing the timing for opening the exhaust valve and is, at the same time, capable of changing the amount of lift and/or the operation angle.

What we claimed are:

1. An apparatus for controlling timings of exhaust valves comprising:

a variable valve timing mechanism for varying timings for opening and closing exhaust valves.

a complete combustion detection means for detecting the complete combustion state of an engine based on whether or not a rotational speed of the engine becomes equal to or greater than a predetermined rotational speed.

a cranking detection means for detecting the cranking state of the engine and a valve timing control means for controlling said variable valve timing mechanism in order to advance, by a predetermined angle, the timing for opening the exhaust valve for a predetermined period of time after a time after the lapse of a predetermined delay time from when the completer combustion state of the engine is detected.

2. (NEW) The apparatus for controlling timings of exhaust valves according to claim 1, wherein said valve timing mechanism advances the timing for opening the exhaust valve only when the engine is in a predetermined light-load operation state.

3. (NEW) The apparatus for controlling timings of exhaust valves according to claim 1, wherein said valve timing mechanism variably sets a predetermined angle for advancing the timing for opening the exhaust valve depending on the load exerted on the engine and the rotational speed of the engine.

4. (NEW) The apparatus for controlling timings of exhaust valves according to claim 1, wherein said valve timing mechanism varies said predetermined period of time for advancing the timing for opening the exhaust valve depending on a temperature of the engine detected in the engine cranking state.

5. (NEW) A method of controlling timings of exhaust valves comprising the steps of detecting a complete combustion state of an engine based on whether or not a rotational speed of the engine becomes equal to or greater than a predetermined rotational speed;

detecting the cranking state of the engine; and controlling timings for opening and closing exhaust valves in order to advance by a predetermined angle, the timing for opening the exhaust valve for a predetermined period of time after a time after the lapse of a predetermined delay time from when the complete combustion state of the engine is detected.

6. (NEW) The method for controlling timings of exhaust valves according to claim 5, wherein the step of controlling includes advancing the timing for opening the exhaust valve only when the engine is in a predetermined light-load operation state.

7. (NEW) The method for controlling timings of exhaust valves according to claim 5, wherein said step of controlling includes variably setting a predetermined angle for advancing the timing for opening the exhaust valve depending on the load exerted on the engine and the rotational speed of the engine.

8. (NEW) The method for controlling timings of exhaust valves according to claim, wherein said step of controlling includes varying said predetermined period of time for advancing the timing for opening the exhaust valve depending on a temperature of the engine detected in the engine cranking state.

* * * * *